T. S. SCOVILLE.
Subsoil Plow.
No. 19,878.  Patented Apr. 6, 1858.
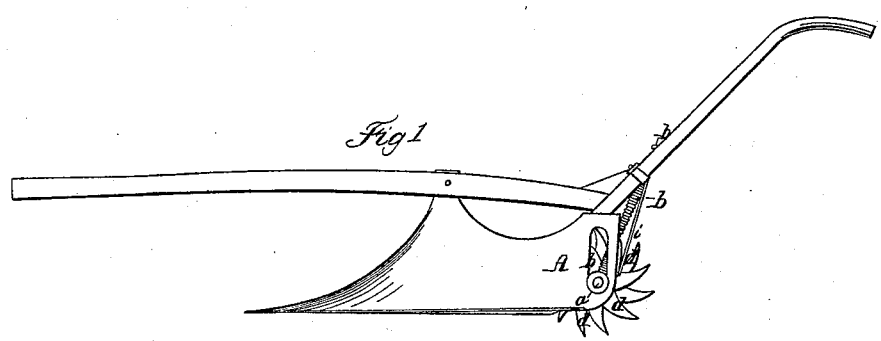
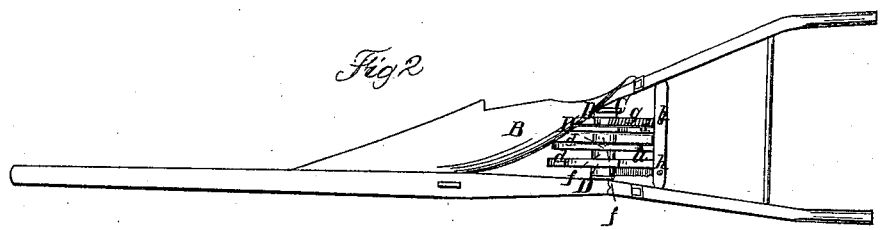
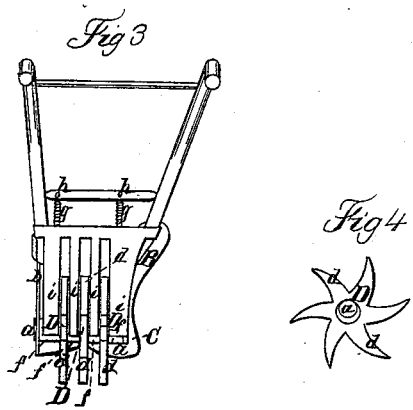

UNITED STATES PATENT OFFICE.

THADDEUS S. SCOVILLE, OF ELMIRA, NEW YORK.

IMPROVEMENT IN PLOWS.

Specification forming part of Letters Patent No. 19,878, dated April 6, 1858.

*To all whom it may concern:*

Be it known that I, THADDEUS S. SCOVILLE, of Elmira, in the county of Chemung and State of New York, have invented a new and Improved Plow; and I do hereby declare that the following is a full and exact description thereof, reference being had to the accompanying drawings, making part of this specification—

Figure 1 being a side view of the plow; Fig. 2, a top view thereof; Fig. 3, a rear view of the same; Fig. 4, view of a part detached.

Like letters designate corresponding parts in all the figures.

In the body or landside A of the plow, and near its rear end, is made a vertical slot, $b$, and in the mold-board B, or in a projecting flange, C, thereof, is formed another vertical slot similar and opposite to that in the landside. In these slots is situated a rod, $a$, which lies horizontally and at right angles to the beam of the plow. This rod serves as the journal for any number from one to four or five of spur-wheels D D D, substantially of the form represented. The spurs $d\ d\ d$ curve forward in the direction of their revolving motion, which is imparted to them by the resistance of the ground as the plow is drawn forward. The central holes of these spur-wheels are considerably larger than the rod $a$, on which they turn, as shown in Fig. 4, so that they will continually slide from one eccentric position to another, and thus more effectually keep the earth from clogging or loading them.

Between the wheels are severally situated washers $f\ f$, &c., which keep said wheels separated and in the proper positions, and at the same time allow them to move freely.

The journal-rod $a$ is kept pressed down to the bottom of its slots by springs $g\ g$, strung upon rods $h\ h$, substantially as represented. These allow the spur-wheels to rise over stones or other obstacles in the bottom of the furrow and yet keep them ordinarily pressed down as far as they are permitted to reach by the slots in which the journal-rod slides. When they are down in this lowest position the spurs should reach some distance below the sole of the plow, as indicated in the drawings. A comb of teeth, $i\ i\ i$, for clearing the adhering earth and other obstructions from the spur-wheels, is situated at the rear of the plow, as represented. They also reach down so that their lower sharp ends nearly or quite touch the washers $f\ f\ f$, and thereby scrape the earth therefrom, and thus keep them clear. The action and utility of this arrangement of spur-wheels and parts connected therewith are obvious. The shape of the spurs $d\ d\ d$, &c., is such that they enter the ground endwise and tear out again sidewise, thus facilitating the entrance into the ground, and also increases the effect of their action.

I do not claim making the eyes of the spur-wheel larger than the journals on which they turn, nor do I claim the simple use of washers or of clearing-teeth; but

What I claim as my invention is—

The combined arrangement of the loosely-turning spur-wheels D D, the separating-washers $f\ f$, and the clearing-teeth $i\ i$, acting upon or close to said washers, substantially as specified, so that the eccentric movements of the said spur-wheels, together with the said closely-fitting washers and clearing-teeth, will effectually keep the implement free from impediment.

In witness that the above is a true specification of my improved plow I hereunto affix my hand this 5th day of February, 1857.

THADS. S. SCOVILLE.

Witnesses:
 A. B. GALATIAN,
 JOSEPH S. PRESCOTT.